United States Patent [19]

Kluge et al.

[11] Patent Number: 4,520,497

[45] Date of Patent: May 28, 1985

[54] ARRANGEMENT FOR PROJECTING DATA ONTO FILM

[75] Inventors: Reimund Kluge, Unterhaching; Eberhard Werner, Peiting, both of Fed. Rep. of Germany

[73] Assignee: Agfa-Gevaert Aktiengesellschaft, Leverkusen, Fed. Rep. of Germany

[21] Appl. No.: 320,762

[22] Filed: Nov. 12, 1981

[30] Foreign Application Priority Data

Nov. 14, 1980 [DE] Fed. Rep. of Germany ....... 3043068

[51] Int. Cl.$^3$ .............................................. H05G 1/28
[52] U.S. Cl. ..................................... 378/166; 378/210
[58] Field of Search .......................... 378/166; 354/105

[56] References Cited

U.S. PATENT DOCUMENTS 3,614,917  10/1971  Wenthe ................................ 318/166
3,628,864  12/1971  Fessenden ........................... 318/166
4,127,322  11/1978  Jacobson et al. ...................... 353/31

*Primary Examiner*—Craig E. Church
*Attorney, Agent, or Firm*—Peter K. Kontler

[57] ABSTRACT

An arrangement for projecting data onto an X-ray film has a housing which is designed to support a film cassette. The housing has a pair of mutually perpendicular slots which are capable of receiving a data carrier card. The slots are so designed that the data-carrying part of the card is exposed when the card is supported in either of the slots. A light source for illuminating the data-carrying part of the card is positioned so as to be on the optical axis of the data-carrying part when the card is accommodated in a first one of the slots but not the second. A partially light-transmissive mirror is mounted between the latter slot and the light source and is inclined at an angle of 45° to both of the slots. The mirror transmits a portion of the light from the light source to one of the slots and reflects the light returning to it from this slot towards the film inverting the image of the data in the process. The mirror further reflects a portion of the light from the light source to the other of the slots and transmits the light returning to it from this slot towards the film without inverting the image of the data. The slot selected for the card is thus determined by the required orientation of the image of the data on the film. A focusing lens is mounted between the mirror and the film. The lens is so arranged relative to the above-mentioned second slot that it is located on the optical axis of the data-carrying part of the card when the latter is inserted in such slot. The position of the light source, as well as the relative positions of the light source and the mirror, make it possible to uniformly and brightly illuminate the data-carrying part of the card in either slot using only a single light source.

16 Claims, 5 Drawing Figures

ARRANGEMENT FOR PROJECTING DATA ONTO FILM

CROSS-REFERENCE TO RELATED APPLICATIONS

This application discloses subject matter similar to that of the copending and commonly-owned U.S. patent application Ser. No. 205,996 of Heinz KROBEL et al. filed Nov. 12, 1980 and entitled "APPARATUS FOR RECORDING DATA ON X-RAY FILMS OR THE LIKE".

This application also discloses subject matter related to that of the commonly-owned DE-OS (German Offenlegungsschrift) No. 27 10 699.

BACKGROUND OF THE INVENTION

The invention relates generally to an arrangement for projecting data onto radiation-sensitive material.

More particularly, the invention relates to an arrangement for projecting data onto film, especially X-ray film. Examples of such data and the time of day the film was exposed and, for X-ray films of humans, the names of the patient and the physician in charge.

German Pat. No. 2,021,494 discloses an arrangement which can be used to project images of data from a data carrier card onto an X-ray film while the film is confined in a cassette. A cassette of the type to be used in the apparatus of the German patent is provided with a window which can be sealed against entry of radiation. The apparatus of the German patent is equipped with means for opening the window of the cassette and with means for imaging data onto that portion of the film which is exposed in response to opening of the window. The information which is imaged onto the film portion behind the window may include the time of day the film was exposed. To this end, the apparatus of the German patent comprises a timer disc which is driven by a motor. The timer disc is mounted adjacent the data carrier card so that the image of the disc can be projected onto the film together with the data from the data carrier card.

The above-referenced, commonly-owned U.S. Pat. application Ser. No. 205,996 also discloses an arrangement for projecting data onto X-ray film. The arrangement has a support which receives a cassette for a sheet of film. The cassette has a window which is normally sealed against radiation but may be opened to expose a portion of the film to be image of data carried by a data carrier. The data carrier is in the form of a card and the arrangement is capable of supporting the card in either of two mutually perpendicular positions in which the portion of the card having the data is exposed. A light source is provided to illuminate the data-carrying portion of the card in either of the two positions of the latter. A partially light-transmissive mirror is arranged at an angle of 45° to both of the positions of the card. The mirror reflects a portion of the light from the light source to one of the positions of the card and transmits the light returning from this position to the film. The mirror furthers transmits a portion of the light from the light source to the other position of the card and reflects the light returning from this position to the film. A lens for focusing the imge of the data onto the film is positioned on the optical axis of one of the two possible positions of the data-carrying portion of the data carrier card.

Arrangements of the above type are generally used to record personal and/or other data on X-ray films of humans.

An X-ray film showing a human heart is usually examined in such a manner that the heart of the patient is located on the right-hand side of the film. In other words, the physician observes the film as if he or she were facing the patient. However, the patient may be X-rayed from the back or the front. In the former case, the X-rays travel from the back of the patient towards the front and a p-a (postero-anterior) X-ray picture results. In the latter case, the X-rays travel from the front of the patient towards the back and an a-p (antero-posterior) X-ray picture results.

The imaging of data such as the name of the patient, the name of the physician, etc. onto the film may be performed either before or after the patient is X-rayed and replaces the laborious procedure of writing the information on the film after development. In order for the data to be properly oriented when the physician reads the film, it is necessary to image the data onto the film differently depending upon whether the film represents a p-a or an a-p picture. It is to this end that the above-referenced, commonly-owned U.S. Pat. application Ser. No. 205,996 proposes that the projection arrangement be designed to accept the data carrier card in either of two different orientations. Furthermore, as discussed earlier, a partially light-transmissive mirror is provided and is used for both orientations of the card. In one orientation of the card, light from the light source is reflected to the card by the mirror and the image of the data is then transmitted through the mirror to the film. In the other orientation of the card, light from the light source is transmitted through the mirror to the card and the image of the data is subsequently reflected to the film by means of the mirror. In the first case, the image of the data is inverted once, namely, by the focusing lens. In the second case, the image is inverted by the mirror and then once more by the focusing lens. Accordingly, appropriate selection of the orientation of the card permits the data to be recorded on the film in the correct orientation regardless of whether the film represents a p-a or an a-p picture.

It has been found that the arrangement of the above-referenced, commonly-owned U.S. Pat. application Ser. No. 205,996 does not provide entirely satisfactory illumination of the data carrier card in either of the orientations of the latter.

OBJECTS OF THE SUMMARY OF THE INVENTION

It is an object of the invention to provide an arrangement for projecting data on radiation-sensitive material which enables good illumination of a data carrier to be achieved.

Another object of the invention is to provide an arrangement of the type described above which is simple yet enables uniform illumination of a data carrier to be achieved.

These objects, as well as others which will become apparent as the description proceeds, are achieved by the invention.

One aspect of the invention resides in an arrangement for projecting data onto radiation-sensitive material, especially X-ray film. The arrangement receiving means for holding an interchangeable data carrier at either of a pair of locations having respective illuminating regions for the illumination of a data-carrying part of the interchangeable data carrier. Supporting means for radiation-sensitive material is provided as is projecting means for projecting an image of the data-carrying part of the data carrier onto the radiation-sensitive material. The projecting means includes a source of illumination which is positioned on the optical axis of a first illuminating region and is common to both this illuminating region and the second illuminating region. The projecting means further includes a partially light-transmissive member which transmits a portion of the light from the illuminating source to one of the illuminating regions and reflects light from the illuminating region towards the supporting means. The partially light-transmissive member also reflects a portion of the light from the illuminating source to the other illuminating region and transmits light from the latter region towards the supporting means. The partially light-transmissive member is located between the illuminating source and the above-mentioned first illuminating region.

By positioning the illuminating source on the optical axis of one of the illuminating regions, the invention makes it possible to properly and uniformly illuminate both illuminating regions with a single source of illumination. Furthermore, only one illuminating aperture is required in accordance with the invention.

In a preferred embodiment of the invention, the locations which receive the data carrier are substantially planar and normal to one another and the partially light-transmissive member makes an angle of about 45° with each of these locations. Furthermore, a lens for focusing the images which are projected towards the radiation-sensitive material is positioned on the optical axis of the above-mentioned second illuminating region.

The supporting means of the arrangement may be adapted to receive a cassette which accommodates a sheet of radiation-sensitive material, e.g. X-ray film. The cassette may be provided with a window or opening which is capable of being sealed against light but may be opened to expose a portion of the radiation-sensitive material to the image of the data-carrying part of the data carrier.

The novel features which are considered as characteristic of the invention are set forth in particular in the appended claims. The improved arrangement itself, however, both as to its construction and its mode of operation, together with additional features and advantages thereof, will be best understood upon perusal of the following detailed description of the certain specific embodiments with reference to the accompanying drawing.

DESCRIPTION OF THE PREFERRED EMBODIMENTS

Figure 1:
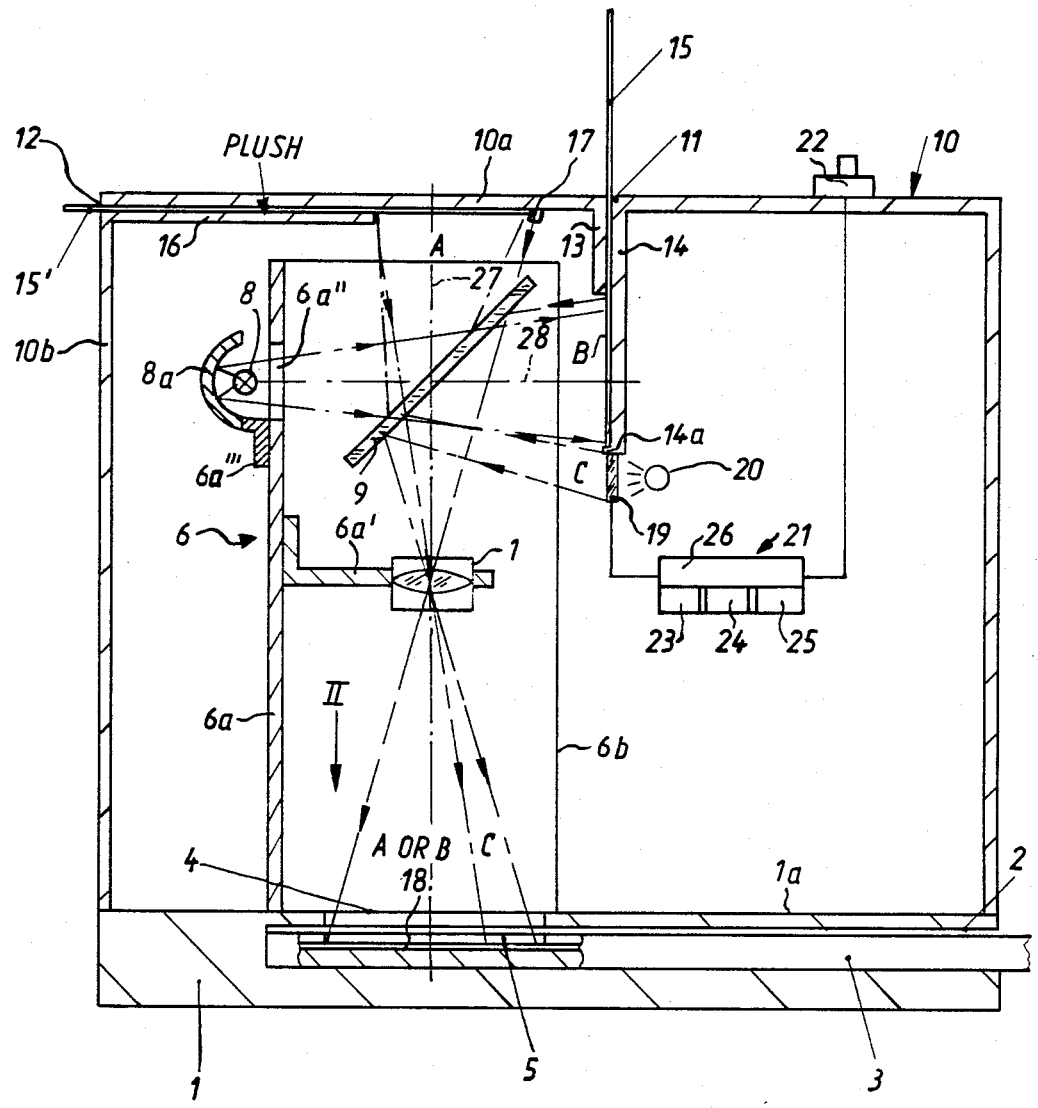
FIG. 1 is a schematic vertical section view of an arrangement according to the invention.

The apparatus of FIG. 1 comprises a base or supporting means 1 which is formed with a pocket or socket 2 for cassette or an analogous receptacle 3 containing a body of radiation-sensitive material 18, e.g., a sheet of X-ray film. The plate-like upper portion 1a of the base 1 located above the socket 2 is formed with a window or opening 4 in register with the window or opening 5 of the cassette 3. The window 4 in the upper portion 1a of the base 1 is partially surrounded by an upstanding, U-shaped holder 6 having three upright walls of which only the walls 6a and 6b can be seen in FIG. 1. The third wall is located in front of the plane of FIG. 1 and is parallel to the wall 6b.

The holder 6 supports a focusing lens 7 which is installed in a bracket 6a' *secured to the inner side of the wall 6a*. The wall 6a is provied with an opening 6a" and a light source or projection lamp 8 is located externally of the holder 6 in the region of the opening 6a". *A parabolic reflector 8a* circumscribes the light source 8 and is arranged to reflect the light from the light source 8 into the interior of the holder 6 via the opening 6a". The reflector 8a is mounted on a bracket 6a''' secured to the outer side of the wall 6a. A partially light-transmitting mirror 9 is arranged internally of the holder 6 in the path of the light reflected into the holder 6 by the reflector 8a.

The holder 6 rests on or is secured to the upper portion 1a of the base 1, and the latter forms part of a housing 10 having a horizontal top wall 10a which is remote from the parallel to the portion 1a. The housing 10 is formed with two receiving means in the form of slots 11 and 12 the frist of which is generally vertical and extends at right angles to the plane of the top wall 10a. The slot 12 is generally horizontal and is provided in a side wall 10b of the housing 10 so that it is adjacent to the underside of the top wall 10a. The slot 11 is bounded by two slightly spaced, parallel guide walls 13 and 14 the latter of which is longer so that a portion B of a data carrier card 15 which is inserted into the vertical slot 11 is exposed and faces the mirror 9. The lower end portion of the guide wall 14 is provided with a projection 14a which constitutes a stop for the lower edge portion or leader of the data carrier card 15. The data on the portion B of the card 15 can be imaged onto that portion of the X-ray film 18 in the cassette 3 which is exposed to light below the windows 4 and 5. The downward movement of the data carrier card 15 is arrested automatically when its leader strikes the stop 14a. At such time, a selected portion, namely, the portion B, of the datad carrier card 15 remains exposed because the guide wall 13 is shorter than the guide wall 14.

The top wall 10a of the housing 10 constitutes the upper guide wall for a data carrier card 15' which is inserted into the slot 12. The side wall 10b of the housing 10 is formed with or supports a further guide wall 16 which is relatively short. This allows a portion A of the data carrier card 15' to be exposed and face downwardly toward the base 1 when the card 15' is fully inserted in the slot 12 so that its leader abuts against a projection or stop 17 at the underside of the median portion of the top wall 10a. The exposed portion A of the card 15' faces one side of the mirror 9 while the exposed portion B of the card 15 faces the other side of the mirror 9. The mirror 9 is positioned in such a manner that it makes an angle of 45° with both the exposed portion A of the card 15' and the exposed portion B of the card 15.

If desired, those sides of the guide walls 13, 14 and 10a, 16 which face the respective cards 15, 15' in the receiving means or slots 11, 12 can be coated with plush as denoted by a legend applied to the upper side of the guide wall 16. This reduces the likelihood of penetration of outside light into the interior of the housing 10 when the card 15 or 15' is withdrawn from the respective slot 11 or 12.

The lens 7 lies on the optical axis 27 of the exposed portion A of the card 15' while the light source 8 lies on the optical axis 28 of the exposed portion B of the card 15. The optical axes 27 and 28 intersect the mirror 9 at an angle of 45° and intersect one another at right angles in the plane of the mirror 9. As will now be explained, this arrangement enables each of the exposed portions A, B of the respective cards 15', 15 to be adequately illuminated by the light source 8 and further enables the image of each of the exposed portions A, B to be focused by the lens 7.

Light from the light source 8 travels towards the mirror 9 both directly from the light source 8 and by reflection from the reflector 8a. Part of the light from the light source 8 is reflected by the mirror 9 to the exposed portion A of the card 15'. The exposed portion A is thus illuminated and reflects light back towards the mirror 9. The light reflected from the exposed portion A, which carries the image of the latter, is transmitted through the mirror 9 and focused by the lens 7 onto the exposed portion of the film 18 below the windows 4 and 5. The image of the exposed portion A is thus unaffected by the mirror 9, that is, the image of the exposed portion A is not inverted by the mirror 9.

Part of the light from the light source 8 is transmitted through the mirror 9 to the exposed portion B of the card 15. The exposed portion B is thus illuminated and reflects light back towards the mirror 9. The light reflected from the exposed portion B, which carries the image of the exposed portion B, is reflected by the mirror 9 towards the lens 7. The latter then focuses the image of the exposed portion B onto the exposed portion of the film 18. Since the mirror 9 reflects the light which returns to it from the exposed portion B, the image of the exposed portion B is inverted by the mirror 9.

The portions A and B of the respective data carrier cards 15' and 15 bear information such as the name, age, sex, address and marital status of a patient; the nature of the illness, the nature of the treatment and/or other information pertaining to the patient; the name of the physician in charge; the name of the hospital or sanatorium; and/or other data.

The guide wall 14 is disposed above a composite, strip-shaped auxiliary carrier of information 19 which is located in front of a second light source 20. The auxiliary carrier 19 may, for example, consist of a row to twelve liquid crystals which are disposed next to or above one another. All of the liquid crystals can be exposed to, and transmit light issuing from, the light source 20. It will be noted that the auxiliary carrier 19 is disposed between the light source 20 and the mirror 9. The light source 20 preferably extends in substantial parallelism with, and has the same length as, the auxiliary carrier 19 so that it can properly illuminate all of the liquid crystals. The crystal of the auxiliary carrier 19 are preferably substantially coplanar with the exposed portion B of the data carrier card 15 in the slot 11. The reference character C denotes the image of the auxiliary carrier 19 which is projected onto the exposed portion of the X-ray film 18 when the light source 20 is on. The image C is reflected by a marginal portion of the mirror 9, i.e., by a portion which does not reflect the image of the exposed portion B and which is not traversed by the image of the exposed portion A, and is projected onto the X-ray film 18 adjacent the image of the exposed portion A or B.

The auxiliary carrier 19 is associated with a control unit 21 which is activable from a control panel 22. The latter is accessible from the exterior of the housing 10. In the embodiment of FIG. 1, the non-illustrated, manually operated data selecting keys, knobs or like elements of the control panel 22 are mounted on top of the wall 10a. The control unit 21 includes an electronic digital clock 23, an electronic digital calendar 24, and a digital counter 25 which can cause the auxiliary carrier 19 to furnish the images of letters, numerals or encoded indicia. The indicia which are furnished in response to actuation of the digital counter 25 can identify certain specific or special features of the picture on the film 18. The control unit 21 comprises an inverting stage 26 which is capable of inverting the image C of the auxiliary carrier 19 depending upon the particular situtation, e.g. whether the X-ray film 18 bears a postero-anterior or an antero-posterior picture of a human chest. It is assumed here, as illustrated in FIGS. 2a–2d, that the picture on the film 18 is rotated 90 degrees relative to the image of the data.

The auxiliary carrier 19 may include a large number of liquid crystals or diapositives and the light source 20 may have a corresponding number of discrete components which are respectively located behind the liquid crystals or diapositives. The selector knobs of the panel 22 can then cause the control unit 21 to illuminate selected components or sections of the light source 20 which, in turn, illuminate the associated liquid crystals or diapositives. In this manner, the data furnished to such crystals or diapositives by the clock 23, calender 24 and/or counter 25 cam be imaged onto that portion of the X-ray film 18 which is located below the windows 4 and 5.

Alternatively, the auxiliary casrrier 19 may comprise a row of shutters behind the liquid crystals or diapositives while the light source 20 is continuous and located behind the shutters. Actuation of the control unit 21 via the selector knobs on the control panel 22 will here open selected shutters thereby causing selected liquid crystals or diapositives to be exposed to light issuing from the source 20. The information supplied to the selected liquid crystals or diapositives by the clock 23, calendar 24 and /or counter 25 is then imaged onto that poriton of the X-ray film 18 which is disposed below the windows 4 and 5.

FIGS. 2a to 2d illustrate two modes of imaging data next to the picture on the X-ray film 18.

Figure 2:
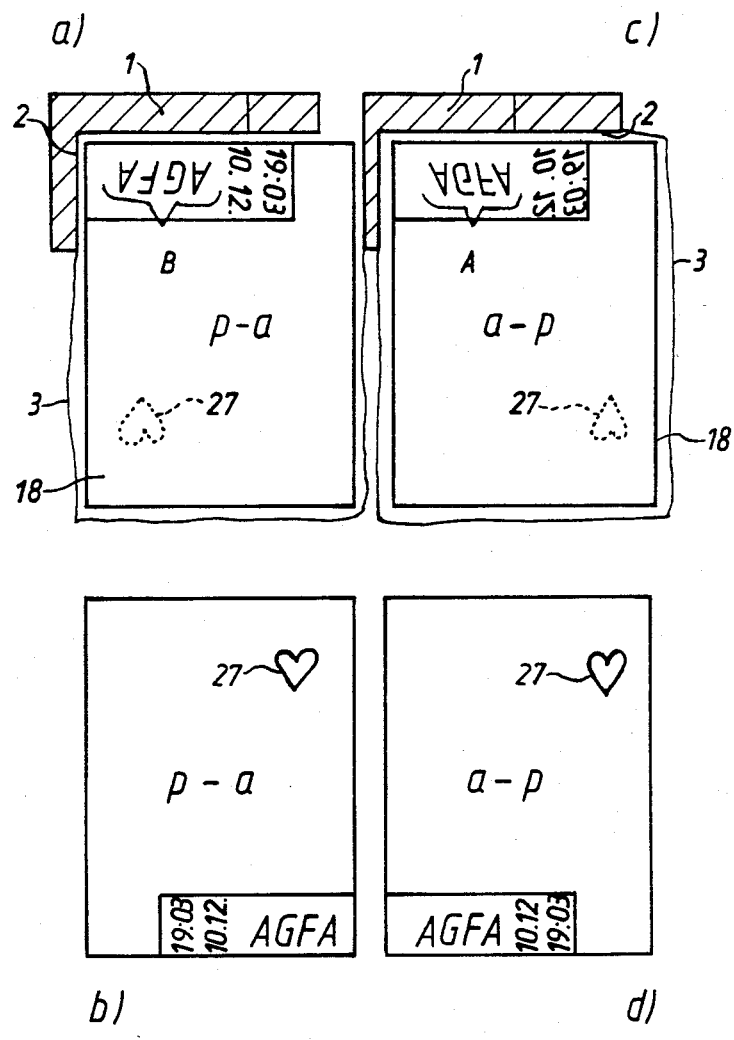
FIG. 2a is a fragmentary plan view as seen in the direction of the arrow II in FIG. 1 and illustrates the imaging of data onto an X-ray film which bears a postero-anterior picture of a human chest.
FIG. 2b shows the X-ray film of FIG. 2a after development.
FIG. 2c is a view similar to that of FIG. 2a but showing the imaging of data onto an X-ray film which bears an antero-posterior picture.
FIG. 2d shows the X-ray film of FIG. 2c after development.

FIG. 2a shows the cassette 3 and a portion of the base 1 and the socket 2. The cassette 3 is assumed to be fully inserted in the socket 2 so that its window 5 registers with the window 4 of the portion 1a of the base 1. For the sake of simplicity, data are shown as being imaged onto the cassette 3.

It is assumed that the side of the film 18 which faces up is that via which radiation penetrates the film 18. Since the picture 27 of the heart of a patient appears on the film 18 upside-down, it may be concluded that the picture 27 is a postero-anterior picture, i.e., the patient was irradiated from the back towards the front. The underside of the cassette 3 faces upwardly and the data carrier card 15 is inserted into the slot 11 so that the exposed portion B of the card 15 is imaged onto the film 18. In other words, the image of the exposed portion B is reflected by the mirror 9 and is thereupon focused by the lens 7. The desired data on the auxiliary carrier 19 are imaged onto the film 18 adjacent the image of the exposed portion B, and such data are disposed in vertical rows. When the film 18 is developed, an observer sees the picture 27 and the data in the manner shown in FIG. 2b assuming that the observer looks at the film as if the patient were seen from the front. The data include the date (December 12) and the time of day (19:03 or 7:03 PM) the picture 27 was made.

FIG. 2c shows an antero-posterior exposure, i.e., the patient was irradiated from the front to the back. In this case, the data carrier card 15' is inserted in the slot 12 so that the exposed portion A of the card 15' is imaged onto the film 18. Light issuing from the source 8 is reflected by the exposed portion A of the card 15' and penetrates the mirror 9 to be focused by the lens 7. Since the exposed portion A is inverted only once, namely, by the lens 7, the exposed portion A is imaged onto the film 18 in an inverted orientation. Contrary to the image of the exposed portion A, the data from the auxiliary carrier 19 is inverted by both the mirror 9 and the lens 7. If nothing further were done, such data would have a readable orientation immediately upon being projected onto the film 18 as opposed to the image of the exposed portion A which has an inverted orientation on the film 18. In order to ensure that the data from the auxiliary carrier 19 can be properly read when a physician observes the film 18 after development as illustrated in FIG. 2d, the inverting device 26 of the control unit 21 is actuated. This causes the data from the auxiliary carrier 19 to be inverted once more so that such data can be properly read when the development of the film 18 in the cassette 3 of FIG. 2c is completed. The films of FIGS. 2b and 2d differs in that the data furnished by the auxiliary carrier 19 appears in different corner regions.

An important advantage of the auxiliary carrier 19 and the associated light source 20 is that the carrier 19 can be activated or deactivated at the will of a technician. This is in contrast to the aforementioned disc disclosed in the German Pat. No. 2,021,494. Since the disc is illuminated by the projection lamp for the data carrier card, i.e. by a lamp corresponding to the light source 8 shown in FIG. 1, the image of the disc must appear on the X-ray film whenever a technician decides to expose data on the card. However, it is often desirable to omit information such as the date and the time of day an exposure was made and/or other information which is optional.

Another important advantage of the improved apparatus is its surprising versatility. For example, the auxiliary carrier 19 and its light source 20 can image the time which is derived from a stop watch rather than the exact time of day an X-ray picture was made. This might be of interest when one makes a series of X-ray pictures which are taken at predetermined intervals to ascertain the disappearance of fading of a contrast medium in the body of a patient. Furthermore, the counter 25 can be used to identify successive pictures by numerals and/or letters or by encoded information. Analogously, the information which is furnished by the counter 25 can denote certain other criteria of the X-ray pictures, e.g., circumstances under which the pictures were made, etc.

A further important advantage of the improved apparatus is that it can furnish, in digital form, data pertaining to the date, the time of day, the order of a series of pictures and/or other information. Moreover, the technician in charge of the apparatus can accurately image the exact time and date because he or she can adjust the control unit 21 from the accessible panel 22. Thus, data pertaining to the second, minute, hour, day and month can be selected by the technician rather than by a motor which consumes energy and may be unreliable. The technician can read the time from his or her watch or from an electric clock in the area where the apparatus is installed to thereby ensure that the recorded time is accurate and, in particularly, much more accurate than the times furnished by the motor-driven discs of conventional apparatus. This saves time because there is no need to periodically adjust the clock in the apparatus. The technician observes a watch or clock and records the exact time whenever the need arises by actuating the knobs of the control panel 22.

The advantages of a separate light source 20 for the auxiliary carrier 19 have been pointed out above. Thus, the imaging of data furnished by the auxiliary carrier 19 is independent of the imaging of data on the card 15 or 15'. Moreover, the intensity and/or other characteristics of the discrete light source 20 for the auxiliary carrier 19 can be selected independently of the corresponding characteristics of the light source 8 so that the liquid crystals or diapositives of the auxiliary carrier 19 can be imaged with a high degree of sharpness in a relatively short period. For example, if a light-emitting diode were used to illuminate the auxiliary carrier 19 as well as the exposed portion A or B of the card 15 or 15', the data from the auxiliary carrier 19 would be underexposed at such time as the image of the exposed portion A or B is properly exposed. Thus, the use of a common light-emitting diode for the auxiliary carrier 19 and the card 15 or 15' would unduly prolong the imaging of data onto the film 18. This may be avoided by the provision of the separate light source 20 for the auxiliary carrier 19.

The cassette 3 may be of the type disclosed in the commonly owned copending application Ser. No. 949,138 filed Oct. 6, 1978 by Manfred Schmidt et al., now U.S. Pat. No. 4,259,586 granted Mar. 31, 1981.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. An arrangement for projecting data onto radiation-sensitive material comprising:
    (a) receiving means for holding an interchangeable data carrier at either of a pair of locations having respective regions for the illumination of a data-carrying part of the interchangeable data carrier;
    (b) supporting means for radiation-sensitive material, said supporting means including holding means for a cassette which accommodates a sheet of radiation-sensitive material and is provided with an aperture which is capable of being sealed against light and of being opened to expose a portion of the radiation-sensitive material to the image of the data-carrying part of the interchangeable data carrier; and (c) projecting means for projecting an image of the data-carrying part of the interchangeable data carrier onto the radiation-sensitive material, said projecting means including a source of illumination which is positioned substantially on the optical axis of a first of said regions and is arranged to illuminate both said first region and the second of said regions, and said projecting means further including a member which transmits a portion of the light from said source to one of said regions and reflects light from said one region towards said supporting means, said member reflecting a portion of the light from said source to the other of said regions and transmitting light from said other region towards said supporting means, and said member being located between said source and said first region.

2. An arrangement as defined in claim 1, wherein said projecting means comprises a lens positioned substantially on the optical axis of said second region.

3. An arrangement as defined in claim 1, wherein said locations are substantially planar and normal to one another.

4. An arrangement as defined in claim 1, wherein the optical axes of said regions intersect at said member.

5. An arrangement as defined in claim 1, wherein said member makes an angle of about 45° with each of said regions.

6. An arrangement for projecting data onto radiation-sensitive material comprising:

(a) receiving means for holding an interchangeable data carrier at either of a pair of locations having respective regions for the illumination of a data-carrying part of the interchangeable data carrier;

(b) supporting means for radiation-sensitive material;

(c) projecting means for projecting an image of the data-carrying part of the interchangeable data carrier onto the radiation-sensitive material, said projecting means including a source of illumination which is positioned substantially on the optical axis of a first of said regions and is arranged to illuminate both said first region and the second of said regions, said projecting means further including a member which transmits a portion of the light from said source to one of said regions and reflects light from said one region towards said supporting means, said member reflecting a portion of the light from said source to the other of said regions and transmitting light from said other region towards said supporting means, and said member being located between said source and said first region; and (d) a housing for said supporting means and said projecting means, said receiving means including a pair of slots in said housing.

7. An arrangement for projecting data onto radiation-sensitive material comprising:

(a) receiving means for holding an interchangeable data carrier at either of a pair of locations having respective regions for the illumination of a data-carrying part of the interchangeable data carrier;

(b) supporting means for radiation-sensitive material;

(c) projecting means for projecting an image of the data-carrying part of the interchangeable data carrier onto the radiation-sensitive material, said projecting means including a source of ilumination which is positioned substantially on the optical axis of a first of said regions and is arranged to illuminate both said first region and the second of said regions, and said projecting means further including a member which transmits a portion of the light from said source to one of said regions and reflects light from said one region towards said supporting means, said member reflecting a portion of the light from said source to the other of said regions and transmitting light from said other region towards said supporting means, and said member being located between said source and said first region; and (d) a partition between said source and said member to prevent direct illumination of said regions by said source, said partition having an opening which is arranged to direct light from said source towards said member.

8. An arrangement as defined in claim 7, comprising reflecting means arranged to reflect light from said source through said opening.

9. An arrangement as defined in claim 8, wherein said reflecting means comprises a parabolic mirror.

10. An arrangement for projecting data onto radiation-sensitive material comprising:

(a) receiving means for holding an interchangeable data carrier at either of a pair of locations having respective regions for the illumination of a data-carrying part of the interchangeable data carrier;

(b) supporting means for radiation-sensitive material;

(c) projecting means for projecting an image of the data-carrying part of the interchangeable data carrier onto the radiation-sensitive material, said projecting means including a source of illumination which is positioned substantially on the optical axis of a first of said regions and is arranged to illuminate both said first region and the second of said regions, and said projecting means further including a member which transmits a portion of the light from said source to one of said regions and reflects light from said one region towards said supporting means, said member reflecting a portion of the light from said source to the other of said regions and transmitting light from said other region towards said supporting means, and said member being located between said source and said first region; and (d) an auxiliary data carrier for the projection of auxiliary data onto the radiation-sensitive material at a location adjacent to the data from the interchangeable data carrier.

11. An arrangement as defined in claim 10, wherein said auxiliary data carrier is positioned adjacent to a selected one of said regions.

12. An arrangement as defined in claim 11, wherein said selected region is said first region.

13. An arrangement as defined in claim 10; and further comprising an additional source of illumination for said auxiliary data carrier.

14. An arrangement as defined in claim 10, wherein said auxiliary data carrier includes multiple data-displaying components; and further comprising regulating means for regulating the data displayed by said components.

15. An arrangement as defined in claim 14, wherein said components comprise liquid crystals.

16. An arrangement as defined in claim 14, wherein said regulating means comprises inverting means for inverting the images of the data displayed by said components.

* * * * *